US012200139B1

United States Patent
Tomei et al.

(10) Patent No.: US 12,200,139 B1
(45) Date of Patent: Jan. 14, 2025

(54) CIRCUIT OPTIMIZATION FOR DIGITAL CURRENCY MINING SYSTEM AND METHOD OF OPERATION

(71) Applicant: Auradine, Inc., Santa Clara, CA (US)

(72) Inventors: Matthew Tomei, Campbell, CA (US); Raju Rakha, Santa Clara, CA (US); Saptadeep Pal, Cupertino, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/784,798

(22) Filed: Jul. 25, 2024

Related U.S. Application Data

(60) Provisional application No. 63/528,891, filed on Jul. 25, 2023.

(51) Int. Cl.
    *H04L 9/32* (2006.01)
(52) U.S. Cl.
    CPC .................. *H04L 9/3236* (2013.01)
(58) Field of Classification Search
    None
    See application file for complete search history.

(56) References Cited

U.S. PATENT DOCUMENTS

| | | | | |
|---|---|---|---|---|
| 2020/0151015 | A1* | 5/2020 | Zhao | G06F 9/4881 |
| 2022/0407727 | A1* | 12/2022 | Uysal | H04L 9/50 |
| 2023/0037377 | A1* | 2/2023 | Fresa | G06Q 40/06 |

* cited by examiner

*Primary Examiner* — Nelson S. Giddins
(74) *Attorney, Agent, or Firm* — Shield Intellectual Property pc

(57) ABSTRACT

An electronic system for calculating and mining digital currency using circuit layout optimized for power consumption, performance level, and integrated circuit surface area. A circuit simulation system simulates and evaluates circuit layouts retrieved from a circuit database to identify circuit parameters to compare against threshold values. The circuit simulation varies operational parameters of the circuits simulated to evaluate the active circuit parameters. The operational parameters include voltage levels, clock frequencies, thermal characteristics, and layout characteristics of dedicated components and sub-modules. The active circuit parameters include the effective hash rate, power, performance, and surface area.

20 Claims, 10 Drawing Sheets

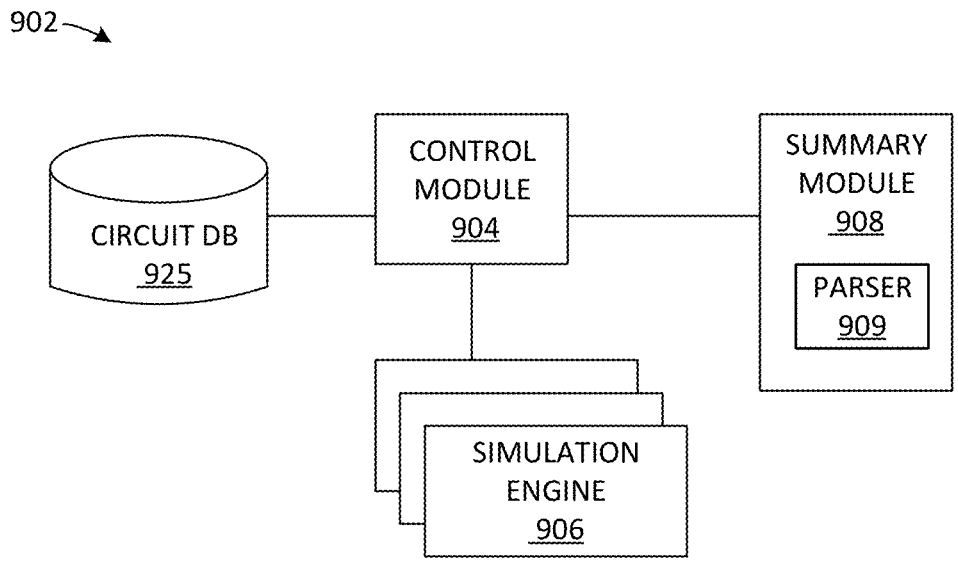

| CIRCUIT LAYOUT 910 | CIRCUIT POWER 930 | LOW CLOCK THRESH. 952 |
|---|---|---|
| INPUT FILE 920 | CIRCUIT PERFORMANCE 932 | HIGH CLOCK THRESH. 954 |
| OUTPUT FILE 922 | CIRCUIT AREA 934 | CLOCK INTERVAL 956 |
| TEST CIRCUIT 924 | POWER THRESHOLD 941 | CLOCK FREQUENCY 958 |
| FILE IDENTIFIER 926 | PERF. THRESH. 942 | CLOCK CONFIG 960 |
| PLL CONFIG 928 | ERROR THRESHOLD 944 | EFF.HASH RATE 962 |
| BLOCK HEADERS 929 | AVERAGE HASH RATE 948 | TARG. EFF. HASH RATE 963 |
| TEST VECTOR INPUT 940 | ERROR RATE 950 | ERROR REGISTER 964 |
|  |  | OPERATING VOLTAGE 966 |

FIG. 9

CIRCUIT OPTIMIZATION FOR DIGITAL CURRENCY MINING SYSTEM AND METHOD OF OPERATION

CROSS-REFERENCE TO RELATED APPLICATIONS

This application claims priority of U.S. Provisional Application Ser. No. 63/528,891, entitled CIRCUIT OPTIMIZATION FOR DIGITAL CURRENCY MINING SYSTEM AND METHOD OF Operation, filed Jul. 25, 2023 which is owned by the Applicant and is hereby incorporated by reference as if fully set forth herein, under 35 U.S.C. § 120.

TECHNICAL FIELD

Embodiments relate generally to data processing systems for digital currency mining and more specifically, to data processing systems with electrical circuits optimized for determining an effective hash rate and methods of manufacture and operation.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development of electronic circuitry and devices for the purpose of calculating cryptographic data for the mining of digital currencies has been influenced by the physical and electrical properties of the materials and structures used to form the electronic components and electric circuitry. These electrical circuits have included computer processors running software, processors with math coprocessors, gate array components, and dedicated custom computing devices.

Because of the large interest in digital currencies, the data processing systems used to calculate certain cryptographic data have rapidly evolved and increased performance levels. Such systems consume significant amounts of electrical power for proper operation. The power and thermal characteristics of these systems influence the usability and economic viability of operation.

The processing systems for calculating digital currency information are rapidly growing and consuming industrial levels of power and requiring more thermal dissipation elements. The performance trade-off between computing efficacy and power usage must be balanced to make such digital currency operations viable.

BRIEF DESCRIPTION OF DRAWINGS

The present invention is illustrated by way of example, and not by way of limitation, in the figures of the accompanying drawings and in which like reference numerals refer to similar elements and in which:

FIG. 9 depicts an example embodiment of a circuit simulation system.

DETAILED DESCRIPTION OF THE INVENTION

In the following detailed description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. Overview
2.0. System Overview
3.0. Functional Overview
4.0. Example Embodiments
5.0. Extensions and Alternatives

1.0. OVERVIEW

Approaches, techniques, and mechanisms are disclosed for manufacturing and operation of the electronic systems discussed herein including digital currency mining systems optimized for power, performance and integrated circuit surface area. The electronic systems can improve performance and enable independent operation of different components of the system.

According to one embodiment, the system can include a circuit simulation system for simulating a first test circuit for determining an effective hash rate of the first test circuit and comparing the effective hash rate of a second test circuit.

According to one embodiment, the first test circuit can be configured as a SHA-256 hash engine having at least one expander and at least one compressor for calculating a hash digest of a message.

According to another embodiment, the system can include a circuit database coupled to the control module, the circuit simulation system, and the summary module.

In other aspects, the inventive subject matter encompasses electronic systems configured to carry out the foregoing techniques.

2.0. SYSTEM OVERVIEW

Figure 1:
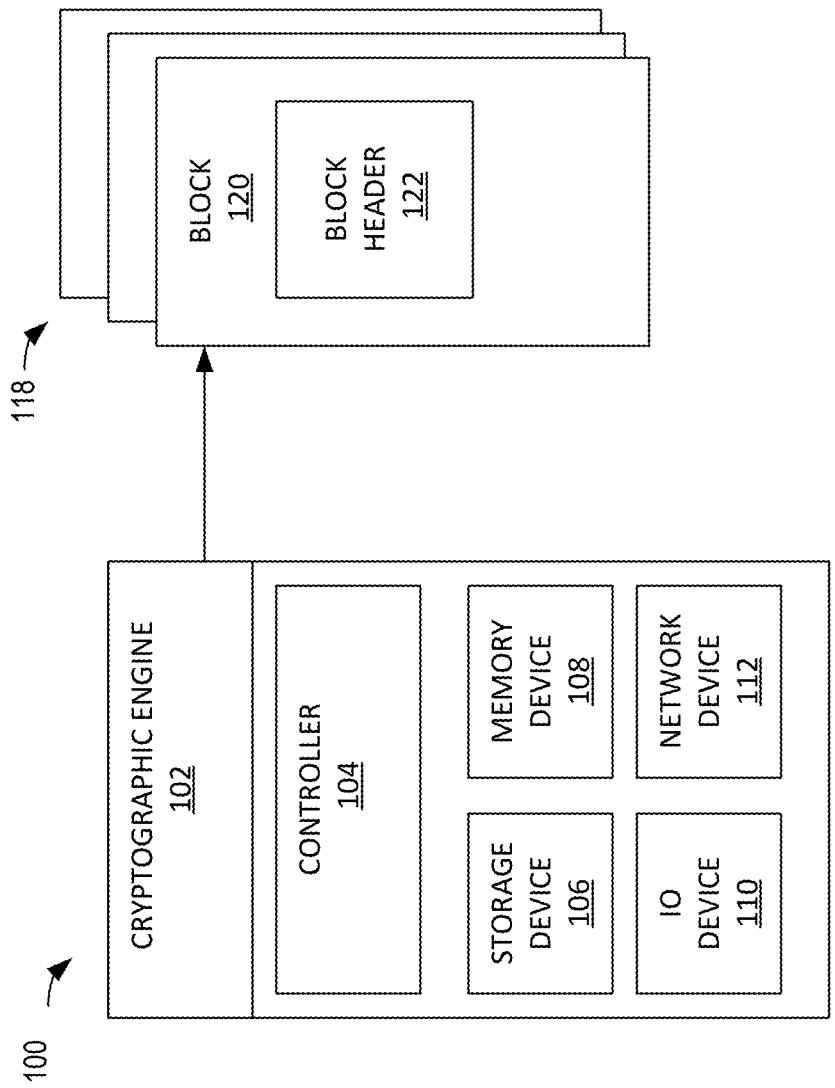
FIG. 1 depicts an example embodiment of a computing system.

FIG. 1 illustrates an example embodiment of an electronic system 100. The electronic system 100, such as a digital currency mining system, can calculate values used for generating blocks 120 of data used to represent elements of a digital ledger, such as used in a blockchain configuration.

The electronic system 100 can have a variety of configurations. In an embodiment, electronic system 100 can include one or more cryptographic engines 102, a controller 104, storage devices 106, memory devices 108, input-output devices 110, and network devices 112.

The cryptographic engines 102 can be used to calculate cryptographic values to represent aspects of the digital ledger including blocks, block headers, hash values, and other similar values. The cryptographic engines 102 can have different hardware and software configurations. For example, the cryptographic engines 102 can be include dedicated hardware devices including portions of application specific integrated circuits (ASIC), field programmable gate arrays (FPGA), custom circuitry, cryptographic accelerators, processors, or other computing devices.

In some embodiments, the cryptographic engines 102 can be dedicated ASIC devices that have been optimized for power, performance, and surface area. In other embodiments, where the electronic system 100 is a digital currency mining system, the ASIC devices can be optimized to maximize other metrics, such as the effective hash rate. The cryptographic engines 102 can also be optimized for effective hash rate which can be related to the overall performance metric. The cryptographic engine 102 optimized for the maximum effective hash rate can be a proxy value for the other metrics for power, performance, and surface area.

In some embodiments, the controller 104 can be a computer processor for controlling the electronic system 100. In yet other embodiments, the controller 104 can include dedicated electronic circuitry for controlling the other elements of the electronic system 100. The controller 104 can be a CPU, microcontroller, state machine, multi-processor, or other similar device.

The controller 104 can be coupled to the storage devices 106, the memory devices 108, the IO devices 110, and the network devices 112. The storage devices 106, such as disk drives, solid state drives, flash memory, or other bulk data storage devices, can be used to store information and data used and generated by the system.

The memory devices 108 are coupled to the controller 104 and provide active memory devices such as random-access memory that is used for regular operation of the system. The IO devices 110 can be used to communicate with other components and can include keyboards, mice, monitors, and other similar devices. The network devices 112 can provide communication links to other systems. The network devices 112 can include ethernet devices, optical communication devices, and other similar communication devices used to form network connections with other systems.

In some embodiments, the electronic system 100 can be used to calculate one or more of the blocks 120 for the digital ledger. The digital ledger, such as a blockchain 118, can record and be used to validate a series of transactions of the digital currency.

In yet other embodiments, the electronic system 100 can be a node on a Bitcoin network which is a peer-to-peer network of nodes that implement the Bitcoin protocol. The Bitcoin protocol facilitates a blockchain based public distributed ledger.

The nodes on the Bitcoin network are configured to be able to communicate with one or more other nodes. Users on the nodes can broadcast messages to the network including transaction messages describing changes to the ledger, such as the transfer of cryptocurrency to other users.

Each of the nodes has a local copy of the entire ledger. If one or more transactions are invalid, then the transaction can be ignored. The transactions can be validated only when the entire set of nodes in the network agree that they are valid.

Figure 2:
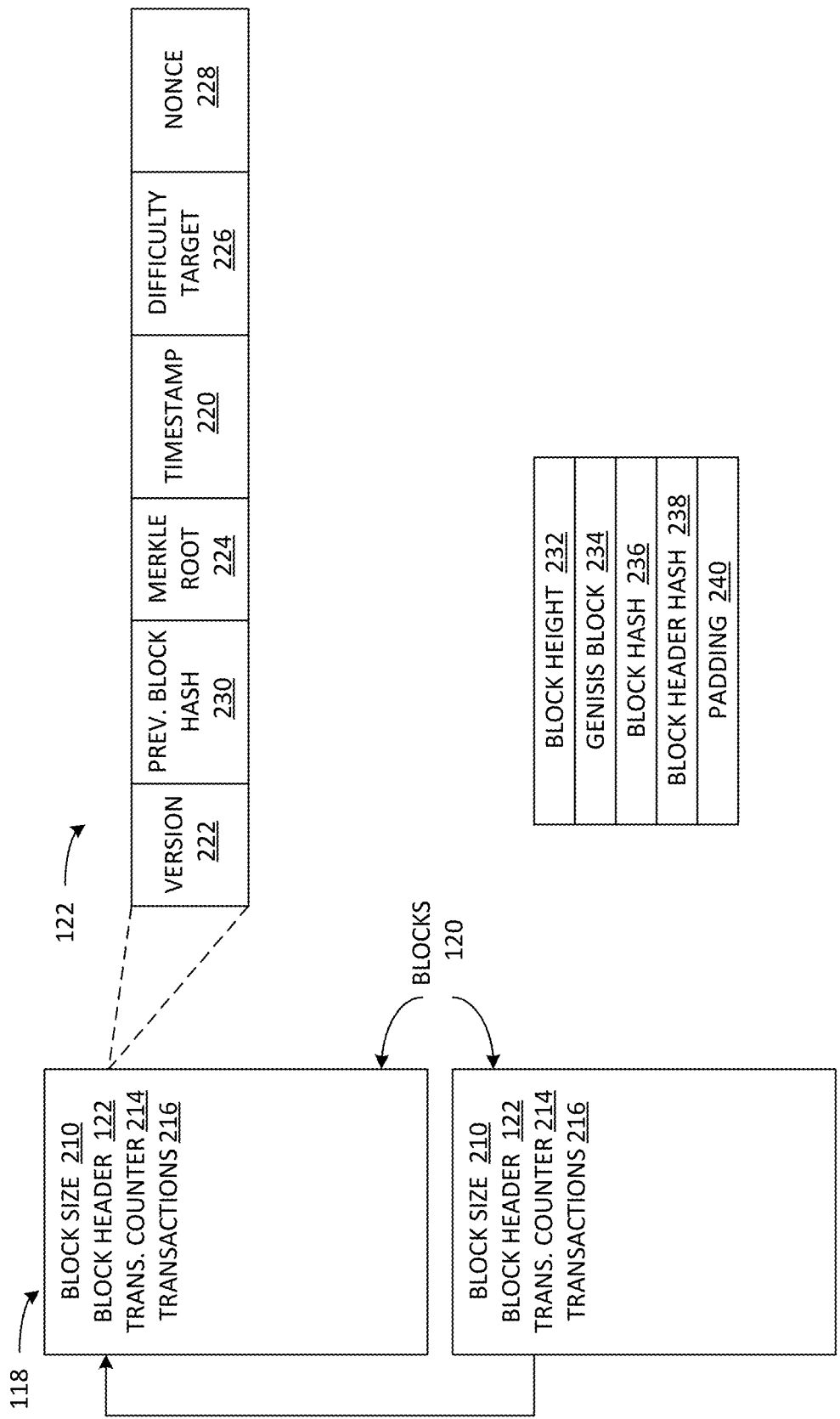
FIG. 2 depicts an example embodiment of a blockchain.

FIG. 2 illustrates an example embodiment of the blockchain 118. The blockchain 118 is a distributed data structure that can represent a digital ledger that can be distributed over a group of computer network nodes. Each of the blocks 120 can include one or more records that describe transactions performed on the digital currency represented by the blockchain 118. Multiple copies of the digital ledger are distributed and stored on the nodes of the network to provide redundancy. This provides a decentralized record of transactions that cannot be altered without being detected simply by comparing one of the blocks 120 on one of the nodes to the equivalent one of the blocks 120 on a different one of the nodes.

The blockchain 118 includes a group of the blocks 120 that are serially linked to one another. In some embodiments, each of the blocks 120 includes block header 122 that includes a pointer to a previous one of the blocks 120 to define the set and order of the blocks 120 making up the blockchain 118.

The blocks 120 can have a variety of data structures. In one embodiment, each of the blocks 120 can include data fields including a block size 210, the block header 122, a transaction counter 214, and a set of transactions 216.

In some embodiments, the block size 210 can be four bytes long and can define the size of the block in bytes. The transaction counter 214 can range between one and nine bytes and indicates the number of transactions 216 in the block 120. The transaction 216 are a variable sized field and includes the details of the transactions 216 recorded in the block 120.

The blocks 120 in blockchain 118 can include entries about the transactions 216 in the block 120. The transactions 216 can include a version number, a flag field, an input counter, an output counter, a set of inputs, a set of outputs, witnesses, and a lock time.

The block header 122 can include a variety of metadata or different data elements used to manage blockchain 118. In some embodiments, the block header 122 can include information such as a timestamp 220, a previous block hash 230, a version 222, a Merkle root 224, a difficulty target 226, and a nonce 228.

In one embodiment, the block header 122 can be sized at 80 bytes. This can include four bytes for the version 222, thirty-two bytes for the previous block hash 230, thirty-two bytes for the Merkle root 224, four bytes for the timestamp 220, four bytes for the difficulty target 226, and four bytes for the nonce 228.

The timestamp 220 in the block header 122 is a time of block generation indicating the number of milliseconds since the block was mined. The time is specified as the number of milliseconds since the beginning of the Unix epoch. Valid new blocks must have a timestamp that is within 140 milliseconds of the actual time.

The Merkle root 224 in the block header 122 is a representation of a hashed data structure to show data verification and integrity for the transactions 216 in the block. The Merkle root 224 is a cryptographic value resulting on calculating a hash value on each node of a Merkle tree representing all of the transactions 216 of one of the blocks 120.

The version 222 in the block header 122 describes the blockchain version of one of the blocks 120. The version 222 can be one of several types including version 1.0 for cryptocurrency, version 2.0 for smart contracts, version 3 for decentralized structure, and version 4.0 for industrial applications.

The difficulty target 226 is a value indicating the complexity and the computational power required to mine the network and find new blocks. It represents a threshold value that can be compared to an intermediate hash value to determine. The difficulty target 226 can also be known as the bits field.

The nonce 228 is a number used to validate the information within the block 120 by calculating a hash value of the block header 122 used to validate the block 120. The hash value is validated if the value is less than another one of the hash value of the block 120.

In some embodiments, additional information can be associated with the blocks 120 and the block header 122. These values can include a height 232, a genesis block 234, and a block hash 236 or block header hash 238.

The height 232, or block height, value can indicate how many blocks are before the current block. Height can be derived from the number of layers of blocks if they were all stacked on top of one another.

The genesis block 234 is the first block in the blockchain 118. The genesis block 234 is a known and fixed block and represent a starting value for the previous block hash 230 of the block 120.

The block hash 236, or the block header hash, is a cryptographic value calculated by performing a hashing operation on the block header 122. The block hash 236 can act as a primary identifier of the block 120. In some embodiments, the block hash 236 can be calculated by performing the SHA-256 hashing operation on the block header 122 twice. This can be designated a double SHA-256 hash operation. The output of the first SHA-256 hashing operation is the input for the second SHA-256 operation to calculate the final double SHA-256 hash result.

The block hash 236 is a unique value because it calculates the hash value on the block header 122 including the updated values of the nonce 228, the Merkle root 224, and the previous block hash 230. In some embodiments, the block hash 236 can be a block header hash 238 which is the hash of just the block header 122. The block hash 236 can also be known as a message hash, message header hash value, hash digest, digest, or a combination thereof. The blocks can also be configured with a padding value 240.

Figure 3:
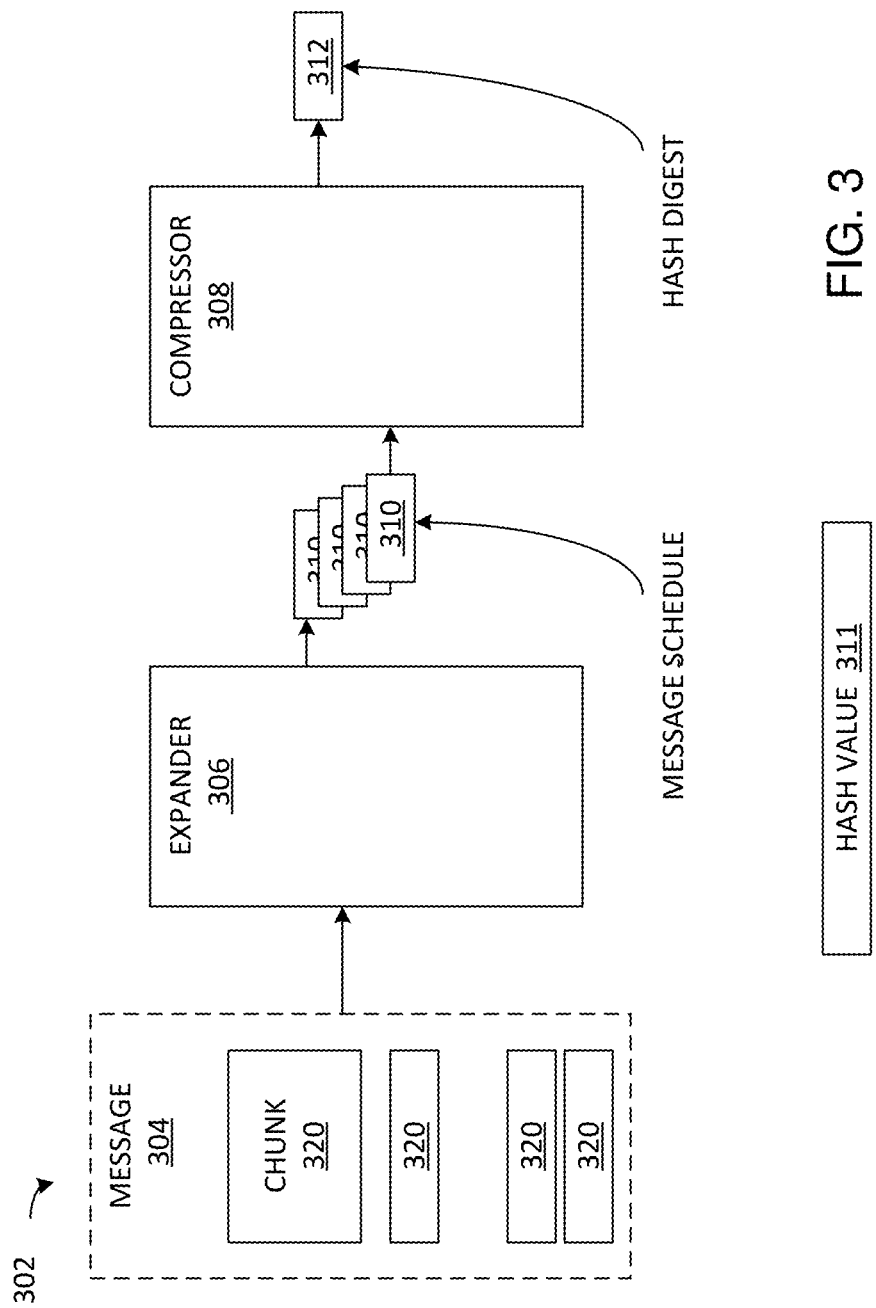
FIG. 3 depicts an example embodiment of a cryptographic hash process.

FIG. 3 illustrates an example embodiment of a cryptographic hash process 302. The cryptographic hash process 302 can be a SHA-256 hash process.

The Secure Hash Algorithm 256 (SHA-256) is a set of cryptographic hash functions for mapping a message 304 of arbitrary size to a hash value 311 which can be a fixed size value, such as a hash, hash value, hash code, or a hash digest 312. The message 304 can be an arbitrary set of data such as a block of data, a block header, or other similar set of data.

The SHA-256 hash process can divide the message 304 into multiple chunks 320 of sixty-four bytes each and process the chunks 320 serially to generate a final version of the hash digest 312. The chunks 320 are formatted and passed through an expander 306 to generate a message schedule 310 of sixty-four words of thirty-two bits each. The expander 306, such as an expander circuit, an expander module, or an expander function, can receive one of the chunks 320 of 512 bits or sixteen thirty-two-bit words and generate an expander output of sixty-four thirty-two-bit words. The expander 306 can make it harder for cryptographic attackers to control the position of bits in the output.

The output of the expander 306, the message schedule 310, can be passed to a compressor 308. The compressor 308 can compress the output of the expander into a 256-bit hash value for the hash digest 312.

Figure 4:
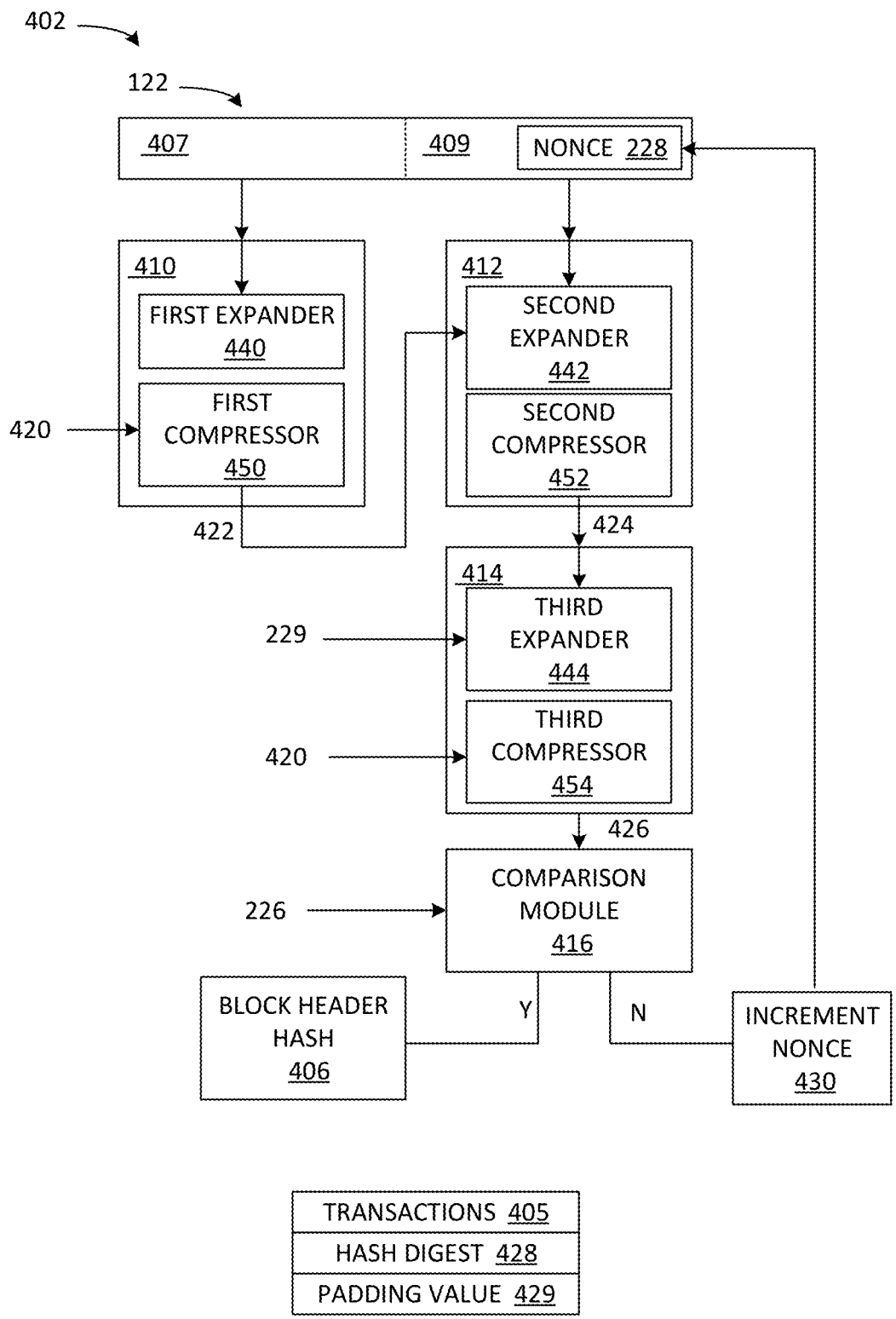
FIG. 4 depicts an example embodiment of digital currency mining process.

FIG. 4 illustrates an example embodiment of a digital currency mining process 402. The digital currency mining process 402 can maintain the public ledger or the blockchain 118 by verifying transactions 405 stored in the blockchain 118.

The digital currency mining process 402, such as the bitcoin mining process, can calculate a block header hash value and update the nonce 228 of the block header 122 that is used to calculate the block hash 236 for the current one of the blocks 120 containing the current value of the nonce 228.

The digital currency mining process 402 can perform a double SHA-256 operation on the block header 122 to determine a block header hash that is less than or equal to the difficulty target 226.

The hash digest 428 is calculated by calculating the nonce 228 for one of the blocks 120 that results in the hash 420 having a value lower than the difficulty target 226.

In some embodiments of the digital currency mining process 402, the first hash module 410, such as a SHA-256 hash module, can receive a first portion 407 of the block header 122 to calculate a first intermediate hash 422 of the first portion 407 of the block header 122. For example, the first portion 407 can be a 512-bit segment of the block header 122. The first portion 407 can be received by a first expander 440 and the result passed to the first compressor 450. The first compressor 450 can also receive a constant value. This produces a first intermediate hash 422 of the first portion 407 of the block header 122 which can be passed to the second hash module 412.

The second hash module 412 can receive a second portion 409 of the block header 122, such as the second 512 bits of the block header 122 including an initial value of the nonce 228, in a second expander 442. The second expander 442 can expand the inputs and pass the result to a second compressor 452. The output of the second compressor 452 is a second intermediate hash 424 which can represent a 1024-bit hash of the block header 122. The second intermediate hash 424 can be passed to a third hash module 414.

The third hash module 414 can receive the second intermediate hash 424 and a padding value 429 in a third expander 444. A third compressor 454 can then receive the output of the third expander 444 and a constant value and can then calculate the block header 426. For example, the block header 426 can be compressed to a 512-bit hash value.

A comparison module 416 can compare the block header 426 to the difficulty target 226. If the block header 426 is less than or equal to that difficulty target 226, then the block 120 is successfully created and the validation is complete. If the block header 426 is not below the difficulty target 226, then an increment nonce module 430 can increment the nonce 228 and the validation process can be cycled again.

Figure 5:
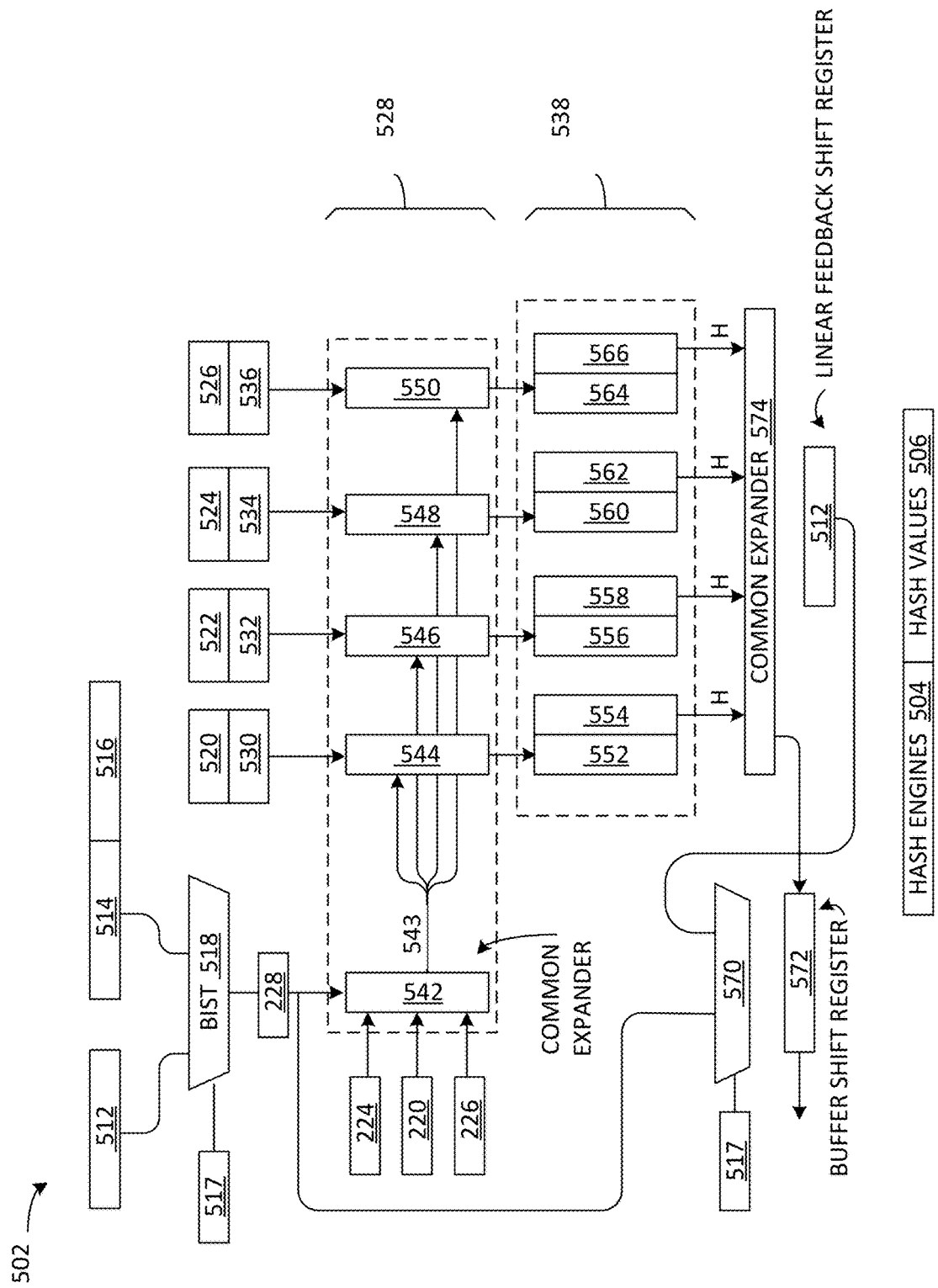
FIG. 5 depicts an example embodiment of a hashing unit.

FIG. 5 illustrates an example embodiment of a hashing unit 502. The hashing unit 502 is a computing device for calculating hash values 506 for a set of chunks of data.

The hashing unit 502 can calculate one or more hash values for a set of data. In some embodiments, the hashing unit 502 can calculate a SHA-256 hash, a SHA-512 hash, a MD5 hash, or other similar hash values.

In an embodiment, the hashing unit 502 can include two or more hash engines 504. In one embodiment, the electronic system 100 can include up to 254 of the hash engines 504. Each of the hash engines can create a hash digest for each record and block. The hash engine can receive portions, or chunks, of data that can be mathematically converted to a hash digest.

In some embodiments, the hashing unit 502 can be configured to include four unrolled double SHA-256 implementation of the hashing unit 502. This can allow a common expander 542 to be shared in common with the other four of the hash engines 504.

The hashing unit 502 can include a built-in self-test multiplexer 518 (BIST multiplexer 518) that can receive a BIST signal 517 for controlling the multiplexer. The BIST multiplexer 518 can receive two sets of input including a linear-feedback shift register 512 (LFSR 512) and a nonce input 515. The LFSR 512 can be the input received from a shift register whose input is a linear function of the previous state. The nonce input 515 can be calculated by combining an engine number 514 and the output of a nonce counter 516. The output of the BIST multiplexer 518 can be the updated value of the nonce 228.

The hashing unit 502 can include a first hash core 528 and a second hash core 538. The first hash core 528 can be configured with a common expander 542 that passes the expander output to four individual compressors.

The common expander 542 can pass the message schedule using a message formed from the nonce 228, the Merkle root 224, the difficulty target 226, and the timestamp 220. The common midstate 543 can be used by the other components, including a first compressor 544, a second compressor 546, a third compressor 548, and a fourth compressor 550.

The first hash core 528 can be configured to use the common expander 542 that is shared with four of the compressors.

In the second hash core 538, each compressor can be configured with a separate expander, such as a fifth expander 552 coupled to a fifth compressor 554, a sixth expander 556.

The hash digest coupled to a sixth compressor 558, a seventh expander 560 coupled to a seventh compressor 562, and an eighth expander 564 coupled to an eighth compressor 566.

Each of the compressors can receive a separate midstate, such as a midstate 0, midstate 1, midstate 2, and midstate 3. Each of the hash cores can be configured to iterate only the nonce. The lower eight bits of the nonce will be a constant for each core and equal to a core identification number.

The system can use a midstate value to hold intermediate results. For example, the midstate value can include a zeroth midstate 520, a first midstate 522, a second midstate 524, and a third midstate 526.

The H3I value is a chaining value used when a hash value is calculated piecemeal, such as H3I chain value 0 530, H3I chain value 1 532, H3I chain value 2 534, and H3I chain value 3 536. The midstate value and the H3I values can be provided to the compressor units in the first stage 536 of the hashing unit 502.

The hashing unit 502 can include a second BIST multiplexer 570 that can be controlled by the BIST signal 517. The second BIST multiplexer 570 can have two inputs including the nonce 228 as received from the first BIST multiplexer 518 and the output of the LFSR 512.

The hash digests from the compressors of the second hash cores can be passed to a comparison module 574 to compare the hash digest to the difficulty target 226. If the hash digest is lower than the difficulty target 226, then the result can be sent to a buffer shift register 572 before being passed to a controller.

Figure 6:
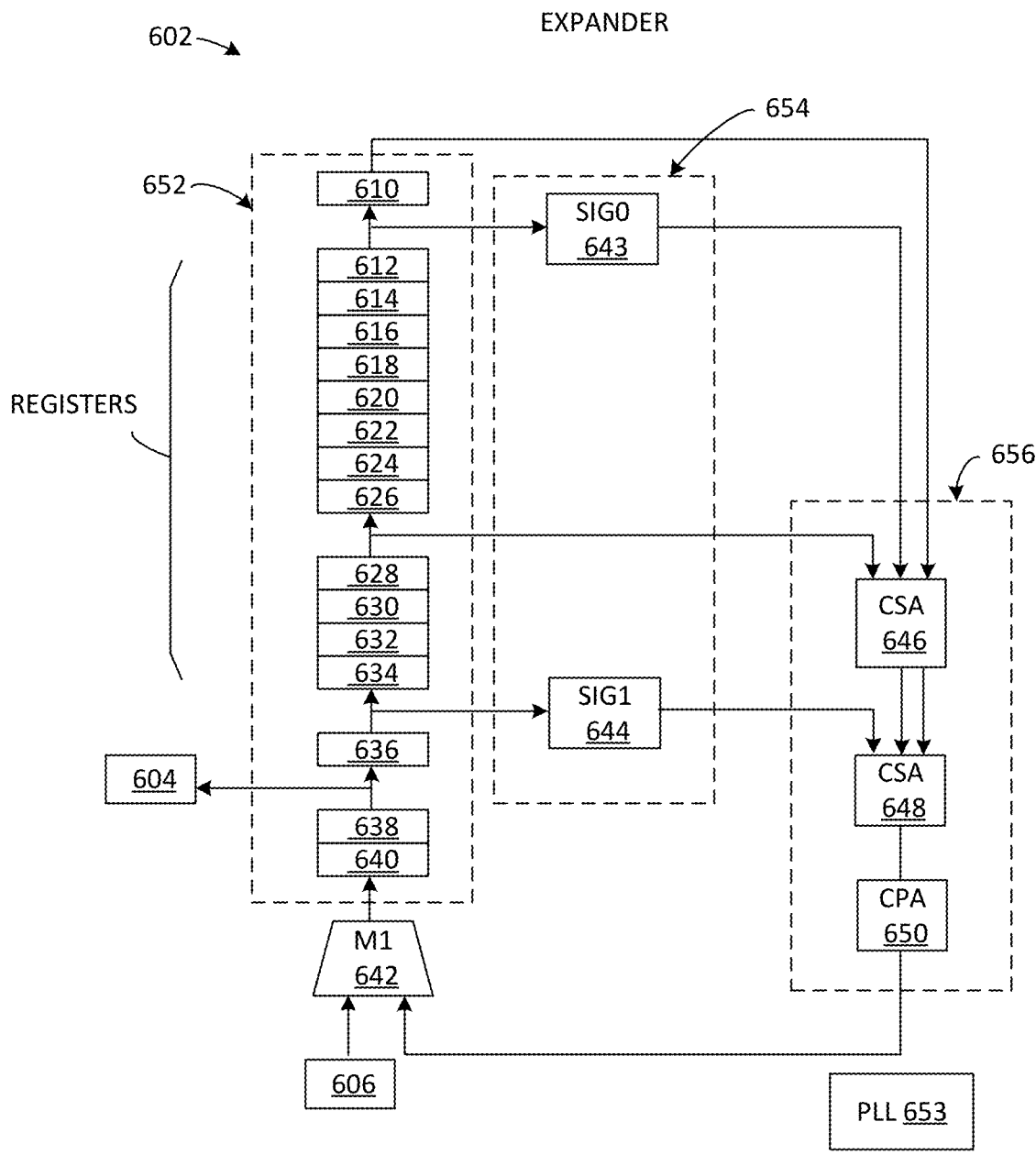
FIG. 6 depicts an example embodiment of an expander unit.

FIG. 6 illustrates an example embodiment of an expander unit 602. The expander unit 602 is a circuit for receiving a message 606 and generating intermediate values for the compressor for calculating a hash value.

The expander unit 602 implements a Message Expander (ME) functionality. In some embodiments, the expander unit 602 can receive the message 606, such as a 512-bit input message, and expand the message 606 into 64 chunks 604 of 32-bit data, such as an array with 64 entries. The chunks 604 are pieces of data generated from message 606.

The expander unit 602 can include a shift register array 652, a sigma block 654, and an adder block 656. The shift register array 652 can be a multi-stage shift register for linearizing the chunks of the message 606.

In some embodiments, the expander unit 602 can include a multiplexer unit 642 which can receive the message 606 and an output from the adder block 656 and send the portions of the message 606 to the multi-stage shift register array 652.

The chunks 604 of the message 606 can be passed to the multi-stage shift register array having a register 610, a register 612, a register 614, a register 616, a register 618, a register 620, a register 622, a register 624, a register 626, a register 628, a register 630, a register 632, a register 634, a register 636, a register 638, and a register 640. The expander unit 602 can generate a message schedule 660 having the 64 of the chunks 604 of data in a specified order. The registers can be used to hold different chunks 604 of the message schedule 660.

The sigma block 654 can include one or more sigma function units, such as a first sigma unit 643 and a second sigma unit 644. The sigma block 654 can calculate intermediate values that can be passed to the adder block 656. For example, the first sigma unit 643 can receive the output of the register 612 and pass the result to a first carry-save adder 646 of the adder block 656. The second sigma unit 644 can receive the output of register 636 and pass the result to a second carry-save adder 648 (second CSA 648) of the adder block 656. Other configurations can be used to optimize performance and reduce power requirements.

The adder block 656 can be implemented in a variety of ways. In one embodiment, the adder block 656 can include the first carry-save adder 646, the second CSA 648, and a carry-propagate adder 650. However, the adder block 656 can be configured with other combination of adder types. The type of adders used can be varied to optimize the functionality of the adder block 656. For example, the adder block 656 can be configured to minimize a critical path for data passing through the adder block 656 to reduce the amount of time and energy needed to perform the operations.

The expander unit 602 can be configured in a variety of ways. In some embodiments, the expander unit 602 and the components can be configured to increase effective hash rate, reduce power consumption, increase performance, or reduce the surface area of the electric circuit on the integrated circuit. Different components can be configured using different techniques to improve the overall effective hash rate of the ASIC.

In some embodiments, the expander unit 602 can be driven at a clock signal 666 at a clock frequency 664. The clock signal 666 can be provided by a phased lock loop unit 653 (PLL 653) that can vary the frequency as needed. The clock signal 666 can be coupled to the electrical components of the expander unit 602 to control the operation of the expander unit 602.

In some embodiments, the configuration of the expander unit 602 can include an expander critical path 668. An expander critical path 668 can be the route through the expander unit 602 with the lowest total delay which can be the sum of the individual delays 670 of each of the components in the expander critical path 668.

Different configurations of the expander unit 602 can change the expander critical path 668. This can be done by optimizing individual components, such as reducing the delay associated with a type of adder. In an example, the expander critical path 668 can be configured as the delays of each of the first sigma unit 643, the first CSA 646, the second CSA 648, the CPA 650, and the multiplexer unit 642. The design of the expander unit 602 can be improved by reducing the amount of the delay 670 for any of the components.

Figure 7:
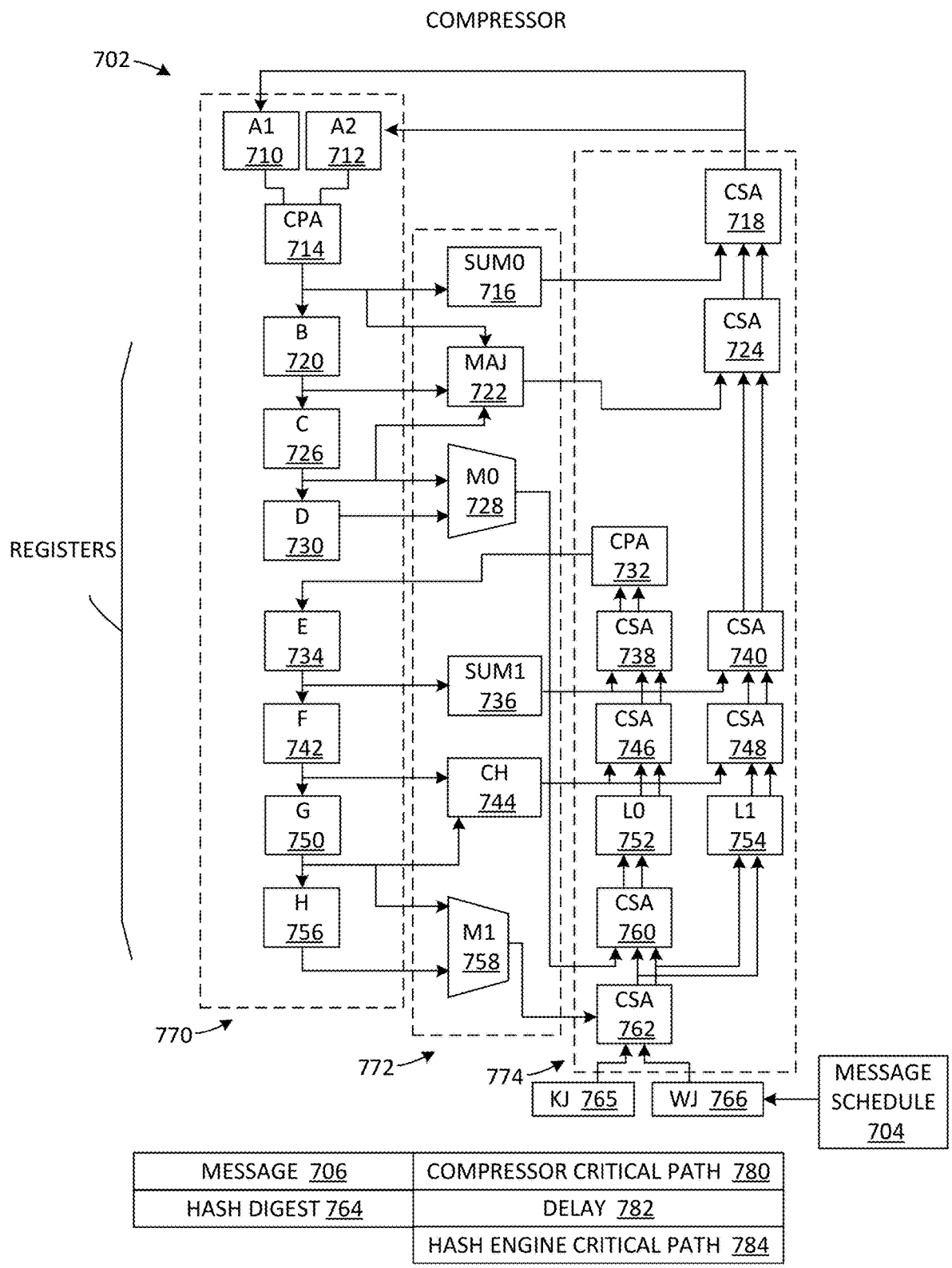
FIG. 7 depicts an example embodiment of a compressor unit.

FIG. 7 illustrates an example embodiment of a compressor unit 702. The compressor unit 702 is a circuit for receiving the message schedule 704 and calculating a hash value.

The compressor unit 702 implements a Message Compressor (MC) functionality. The compressor unit 702 can receive a message schedule 704 from the expander unit 602. For example, the message schedule 704 can be 74 chunks of 32-bit data generated using a message 706.

The compressor unit 702 can include a register block 770, a function block 772, and an adder block 774. The register block 770 can buffer data for calculating a hash digest 764. In an example, the hash digest 764 can be calculated as the addition of A1, A2, B, C, D, E, F, G, and H.

The register block 770 can include multiple registers for temporarily buffering data. The registers can include a register A1 710, a register A2 712, a register B 720, a register C 726, a register D 730, a register E 734, a register F 742, a register G 750, and a register H 756.

In some embodiments, function block 772 can include a variety of functional units. The function block 772 can include a first sum unit 716, a majority unit 722, a first multiplexer unit 728, a second sum unit 736, a choose unit 744, and a second multiplexer unit 758.

The first sum unit 716 can receive the output of the first CPA unit 714. The first sum unit 716 can pass the output to the first CSA unit 718 of the adder block 774.

The majority unit 722 can have three binary inputs and output a result bit that represents the majority value of the three inputs. In some embodiments, the majority unit 722 can receive inputs from the first CPA unit 714, the register B 720 and the register C 726. The output of the majority unit 722 can be passed to the second CSA unit 724.

The first multiplexer unit 728 can receive inputs from the register C 726 and the register D 730. The output of the first multiplexer unit 728 can pass the output to the seventh CSA unit 760.

The second sum unit 736 can receive the output of the register E 734. The result of the second sum unit 736 can be passed to a third CSA unit 738 and the fourth CSA unit 740.

The choose unit 744 can receive inputs from the register F 742 and the register G 750. The output of the choose unit 744 can be passed to the fifth CSA unit 746 and a sixth CSA unit 748.

The second multiplexer unit 758 can receive inputs from the register G 750 and the register H 756. The output of the second multiplexer unit 758 can be passed to the eighth CSA unit 762.

The adder block 774 can add the results of various stages and feedback to the register block 770. The adder block 774 can include a first CSA unit 718, a second CSA unit 724, the third CSA unit 738, a fourth CSA unit 740, a fifth CSA unit 746, the sixth CSA unit 748, a seventh CSA unit 760, a second CPA unit 732, a first register L 752, and a second register L 754.

The first CSA 718 can receive inputs from the first sum unit 716, and two inputs from the second CSA 724. The output of the first CSA 718 can be passed to the register A1 710 and the register A2 712.

The second CSA unit 724 can receive inputs from the majority unit 722 and two inputs from the fourth CSA unit 740. The two outputs of the second CSA unit 724 can be passed to the first CSA unit 718.

The second CPA unit 732 can receive inputs from the third CSA unit 738. The second CPA unit 732 can pass the results to the register E 734.

The third CSA unit 738 can receive inputs from the second sum unit 736 and two inputs from the fifth CSA unit 746. The two outputs of the third CSA unit 738 can be passed to the second CPA unit 732.

The fourth CSA unit 740 can receive input from the second sum unit 736 and two inputs from the sixth CSA unit 748. The two outputs of the fourth CSA unit 740 can be passed to the second CSA unit 724.

The fifth CSA unit 746 can receive inputs from the choose unit 744 and two inputs from the first register L 752. The output of the fifth CSA unit 746 can be passed to the third CSA unit 738.

The sixth CSA unit 748 ca receive input from the choose unit 744 and two inputs from the eighth CSA unit 762. The output of the sixth CSA unit 748 can be passed to the fourth CSA unit 740.

The first register L 752 can receive two inputs from the seventh CSA unit 760. The outputs from the first register L 752 can be passed to the fifth CSA 746.

The second register L 754 can receive two inputs from the eighth CSA unit 762. The output of the second register L 754 can be passed to the sixth CSA unit 748.

The seventh CSA unit 760 can receive inputs from the first multiplexer unit 728 and two inputs from the eighth CSA unit 762. The output of the seventh CSA unit 760 can be passed to the first register L 752.

The eighth CSA unit 762 can receive inputs including a hashing constant 765 (Kj), a register variable 766 (Wej) and the message schedule 704 from the expander unit 602. The output of the eighth CSA unit 762 can be passed to the seventh CSA unit 760.

The compressor unit 702 can be formed in a variety of ways. The example register block 770, function block 772, and the adder block 774 can be configured in different ways. The configuration can include combinations of carry-save adders, full-adders, carry 0 propogate adders, ripple-carry adders, carry-lookahead adders, or other types of adder circuitry. Each type of adder can be configured to have different optimization factors including power, performance, surface area, and effective hash rate. Further the adders within the adder block 774 can have different connections to accommodate the data flow as needed.

In some embodiments, the compressor unit 702 can be driven at the clock signal 666 at the clock frequency 664. The clock signal 666 can be provided by the phased lock loop unit 653 that can vary the frequency as needed. The clock signal 666 can be coupled to the electrical components of the compressor unit 702 to control the operation of the compressor 702.

Each of the components of the compressor 702 can have a delay 782 associated with normal operation. The delay 782 can be expressed as the number of clock cycles required to generate an output based on the inputs.

In some embodiments, the configuration of the compressor unit 702 can include a compressor critical path 780. The compressor critical path 780 can be the route through the compressor unit 702 with the lowest total delay which can be the sum of the individual delays 782 of each of the components in the compressor critical path 780.

Different configurations of the compressor 702 can change the compressor critical path 780. This can be done by optimizing individual components, such as reducing the delay associated with a type of adder. In an example, the compressor critical path 780 can be configured as the delays of each of the CSA 762, the second register L 574, the sixth CSA 748, the fourth CSA 740, the second CSA 724, and the first CSA 718. The design of the compressor unit 702 can be improved by reducing the amount of the delay 782 for any of the components. In addition to the expander critical path 668 and the compressor critical path 780, there is a hash engine critical path 784 which can represent the critical path through both the expander unit 602 and the compressor unit 702.

In other embodiments, the compressor unit 702 can be configured to operate at different voltage levels. The components of the compressor unit 702 can be coupled to a common power source or can be powered on a group basis to provide different power levels to different components or sets of components. Configuring the compressor unit 702 to use different power levels can reduce the power consumption of the circuit. Similarly, the compressor unit 702 can be configured to use different power levels at different clock frequencies.

Figure 8:
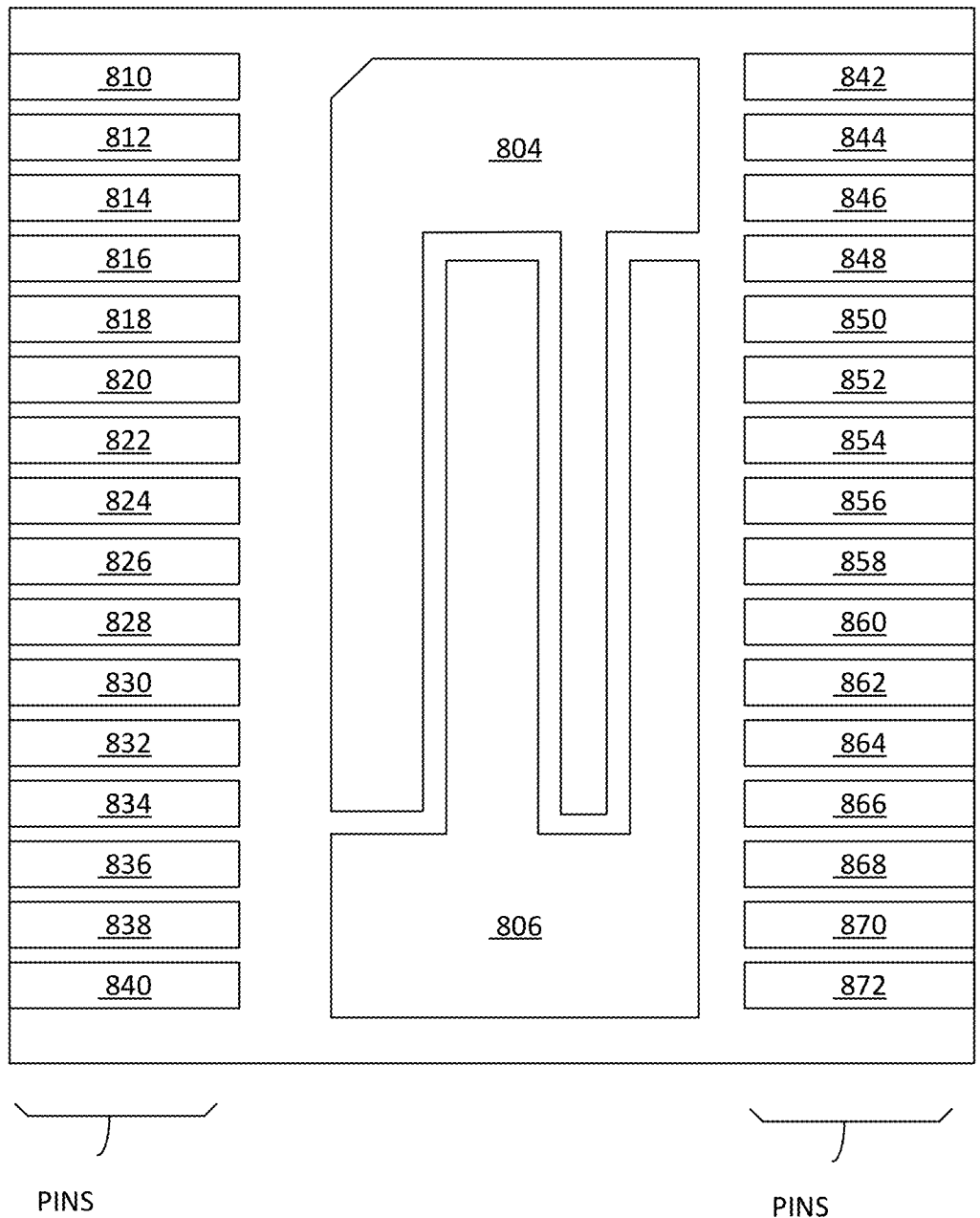
FIG. 8 depicts an example embodiment of an application specific integrated circuit chip.

FIG. 8 illustrates an example embodiment of an application specific integrated circuit chip 802 (ASIC 802). The ASIC 802 can be used to implement one or more of the hash engines. The ASIC 802 can have conductive pins to provide input and output signals as well as other pins for power and ground busses.

The ASIC 802 is an application specific integrated circuit designed to function as a set of high-performance hash engines. It can include internal circuitry customized to perform a variety of function such as cryptographic functions, logic function, arithmetic function, and other related functions.

The ASIC 802 can have a variety of configurations related to power and power distribution. In an embodiment, the ASIC 802 can have a source voltage trace 804, such as VDD_DLV, and a ground trace 806, such as VSS.

In some configurations, the ASIC 802 can have a set of identification pins to uniquely identify and address the hash engines of the ASIC 802. This can include ID [0] 810, ID [1] 812, ID [2] 814, and ID [3] 816. The ASIC 802 can have other identification pins including ID [7] 842, ID [6] 844, ID [5] 846, and ID [4] 848.

The ASIC 802 can have additional power and ground pins including a VSS1 pin 818, a VSS_IO pin 824, a VSS2 pin 850, a VDD_SCV pin 820.

The ASIC 802 can have a test pin 820, such as test_mode_i. The ASIC 802 can have a thermal trip reset output pin 854, such as thermal_trip_o_reset_n_i and a thermal trip reset input pin 854, such as thermal_trip_i_reset_n_o. The ASIC 802 can have a VDD_IO pin 824.

The ASIC 802 can have response pins including a response input command output pin 826, such as response_i_command_o and a response output command input pin 858, such as response_o_command_i. The response pins can transfer response information from the ASIC 802.

The ASIC 802 can have clock pins including a clock input output pin 828, such as clock_i_o and a clock output input pin 860, such as clock_o_i. The clock pins can be used to propagate clock signals.

The ASIC 802 can have command pins including a command input response output pin 832, such as command_i_response_o and a command output response input pin 864, such as command_o_response_i. The command pins can be used to propagate command signals.

The ASIC 802 can have other power pins such as a VDD_IO pin 830, a VDD_IO pin 836. The ASIC 802 can have a VDD_SCV pin 838. The ASIC 802 can have a VDD_IO pin 840.

The ASIC 802 can have other test pins. For example, the ASIC 802 can have a test clockout output pin 852.

The ASIC 802 can have thermal trip related pins including a thermal trip output reset pin 854, such as thermal_trip_o_reset_n_i. The ASIC 802 can have a reset thermal trip output pin 834, such as reset_n_i_thermal_trip_o, and a reset thermal trip input pin 866, such as reset_n_o_thermal_trip_i.

The ASIC 802 can have a response output command input pin 858, such as response_o_command_i. The ASIC 802 can have a command output response input pin 864, such as command_o_response_i.

The ASIC 802 can have power pins including a VDD_IO pin 856 and a VDD_IO pin 862. The ASIC 802 can have a VDD_IO pin 868. The ASIC 802 can have a VDD_SCV pin 870. The ASIC 802 can have a VDD_IO pin 872.

The pinout of the ASIC 802 shows how the internal circuitry can receive and distribute power and communication signals. The ASIC 802 can be combined with another of the ASIC 802 to form a multi-unit configuration with each of the ASIC 802 communicating with other similar chips.

The ASIC 802 can be configured to operate together with another of the ASIC 802 chips in a variety of ways. The ASIC 802 can operate in an array configuration, in a daisy-chain configuration, or a combination thereof.

FIG. 9 illustrates an example embodiment of a circuit simulation system 902. The circuit simulation system 902 can receive one or more test circuits 924 defined in input files 920 and simulate the operation of the circuits to determine the operational parameters of the circuit including power, performance, and required surface area of a circuit layout 910.

The circuit simulation system 902 can be used to evaluate the test circuit 924 to determine if that design and performance of the test circuit 924 is better than other designs. The circuit simulation system 902 can simulate the operation of the test circuit 924 to monitor the behavior of the test circuit 924. This can include determining an effective hash rate 962 which can show the number of validated blocks and transactions processed in terms of the number of hashes calculated per second.

The circuit simulation system 902 can have a variety of configurations. In some embodiments, the circuit simulation system 902 can include automation components that can retrieve different circuits, generate different circuits, simulate the circuits, and evaluate the circuits. In other embodiments, the circuit simulation system 902 can have other configurations including standalone systems, manual systems, or other similar systems.

In various embodiments, the circuit simulation system 902 can include different components. The circuit simulation system 902 can include a control module 904, a simulation engine 906, and a summary module 908.

The control module 904 can control the overall operation of the circuit simulation system 902. This can include retrieving one or more of the input files 920 from a circuit database 925, controlling test and data flow, and providing output. The circuit database 925 can store one or more of the input files 920 that define the configuration of the test circuit 924. The input file 920 can include a file identifier 926 to uniquely identify the file in the circuit database 925.

The input file 920 can be simulated using a vector input with a large number of test value inputs or points. The test data can be in a constrained range of values to focus on specific test conditions. The test values can be constrained in different ways. In one embodiment, the input data range can have a uniform random distribution. This allows coverage of a specific range when evaluating the performance of test circuit 924. This can allow for testing of the longest data path through the test circuit 924.

In another embodiment, test vector inputs 940 can be configured to test for a specific workload type and focus on known inputs. These test vector inputs can be varied and generated on an individual basis or generated programmatically as in a Monte Carlo analysis dataset. The test vector input 940 can be configured to be a random distribution of test data, specific data tailored to exercise specific portions of the test circuit 924, or other similar test configurations.

In some embodiments, the control module 904 can include hardware, software, or a combination thereof. The control module 904 can include a user interface, data storage units, memory units, display unit, communication units, and other similar units.

The control module 904 can retrieve one or more of the input files 920 from the circuit database 925. The circuit database 925 can be implemented in a variety of ways. The circuit database 925 can be a relational database, a non-relational database, a text file, a binary file, or a combination thereof.

The input file 920, such as a component netlist file, is a textual representation of a circuit and can describe the components and connections between components that make up the test circuit 924. In some embodiments, the input file 920 can include or be linked to operational directives used to drive the simulation of the circuit and generate an output file 922 having information about the electrical performance and status of the test circuit 924 during the simulation. The input file 920 and the simulation engines 906 can support the automatic swapping of modules, such as the circuit modules from the libraries.

The input file 920 can be linked to or can include data capture instrumentation directives for evaluating the test circuit 924. The directives can include test scripts and parameter variations for evaluating the test circuit 924. The test circuit 924 can include pipelines and multi-stage circuit. The output directives for the test circuit 924 can include capturing data for intermediate stages on the circuit.

In some embodiments, the simulation engine 906 can support analysis of heat threshold and hot spots on the test circuit 924. This can include evaluation of the power infrastructure of the test circuit 924, such as power and ground bus layouts, proximity analysis, and other similar items. This can be especially useful around critical modules such as the hash engines and related components.

In yet other embodiments, the input file 920 can support static and dynamic variations of different clock frequencies, different power ranges for different components, ranges of voltages for different components and modules, and the physical and electrical effects of vias and corners. Input file 920 and the simulation engine 906 can process enhanced cooling techniques including closed loop cooling subsystems and components.

The output file 922 is a textual report of the simulation of the test circuit 924. The output file 922 can include data reporting the electrical conditions at points within the test circuit 924. In some embodiments, the output file 922 can include complex information such as wave forms, physical area of models and sub-models, frequency, or other parameters.

The simulation engine 906 can mathematically model and simulate the execution of the test circuit 924 in the input file 920. The simulation engine 906 can receive the input file 920 and simulate the circuit described in the file to generate the output file 922 using a variety of techniques.

In some embodiments, the simulation engine 906 can use a modified nodal analysis technique to solve electrical circuits for both static and dynamic conditions including performing AC analysis, DC analysis, DC transfer curve analysis, noise analysis, transfer function analysis, transient analysis, and other similar techniques.

The simulation engine 906 can have a variety of configurations. In some embodiments, the simulation engine 906 can include a computer running a simulation software package, such as SPCE2G6, SPCE3F4, WinSpice, or other similar programs. In other embodiments, the simulation engine 906 can be implemented using custom hardware including co-processors or other performance accelerators to increase performance.

In other embodiments, the simulation engine 906 can solve for the electrical properties of the circuits in the input file 404 using Kirchoff's current law, Kirchoff's voltage law, or both together. The circuit simulation system 902 can also solve for non-linear, time-domain configurations.

The simulation engine 906 can be configured to use a variety of circuit libraries. For example, the input file 404 can include components and other elements retrieved from the SPICE libraries. The input file 404 can include directives to include specific libraries including private and customized libraries. The data in the input file 404 can include standard or default component libraries as well third-party libraries. The libraries can include individual components, circuits, subcircuits, simple and complex circuit models, specialized device models, and other similar elements. In some embodiments, the libraries can include additional metrics such as performance, surface area, a circuit area 934, thermal factors, power usage, or other similar metrics.

Using customized libraries instead of standard cell libraries can provide additional functionality. When standard cell libraries are used, the effective hash rate 962 cannot be measured because the cell delays and timing analysis in the simulation engine 906 is often done for the worst case or worst case with some scaling factors applied. Using customized libraries can allow the simulation engine 906 to better account for the dependence of the effective hash rate 962 on inputs and the current state of the circuit at any point in time as influenced by previous inputs.

The effective hash rate 962 of the test circuit 924 can be determined in a variety of ways. In some embodiments, the effective hash rate 962 can be determined using the simulation engine 906 for a given design and energy consumed for that hash rate by doing a binary search on a clock frequency 958 for which a design operates with an acceptable value of an error rate or tolerable number of errors, such as when an error rate 950 is less than an error threshold 944. The error threshold 944 can be predefined or calculated dynamically. In some cases, the error threshold 944 within a statistical confidence interval is used. Different designs are presented in different sets of the input files 920 to the simulation engine 906 and the resulting power-performance-area (PPA) values or the effective hash rate 962 as measured by that flow are compared to choose the best design embodied in the input files 920. For example, the circuit simulation system 902 can select one of the test circuits 924 from the circuit database 925 and a circuit power 930 and then perform a series of simulations of the test circuit 924 at different values of the clock frequency 958. The different values of the clock frequency 958 used for simulation can be determined using a search, such as a binary search, over a range of the clock frequencies 958, such as from a low clock threshold 952 to a high clock threshold 954 at intervals of a clock interval 956. In other embodiments, the search can include other types of search including linear search, jump search, uniform binary search, exponential search, interpolation search, or other search techniques.

In other embodiments, the effective hash rate 962 can be calculated by using the simulation data of one or more of the hash engines as they process the test vector input 940. One example of calculating the effective hash rate 962 is determining the individual hash rate for one hash value for one of the hash engines and multiply by the total number of hash engines in the ASIC.

Another example of calculating the effective hash rate 962 is to simulate a given number of the hash engines and calculate the effective hash rate 962 as an average of the total number of the individual hash rates being simulated and multiplying an average hash rate 948 by the total number of hash engines being simulated. The effective hash rate 962 can be calculated where the hit rate is the clock frequency divided by (2^#difficulty bits) times the number of hash engines. If no errors are occurring, the circuit should produce hits at a rate of the effective hash rate 962. When errors start happening, the hit rate observed would be less. The test circuit 924 is simulated for large numbers of cycles to calculate the effective hash rate 962 and while the voltage and frequency of operation are varied to observe the true hit rate and then calculate the error rate for each of the voltage frequency pairs. The error rate is the hit rate minus the observed hit rate.

In another embodiment, the test circuit 924 can be used to calculate the effective hash rate 962 under varying operating parameters. The operational power level and the operation clock frequency can be varied for one of the test circuits 924 being simulated to achieve the effective hash rate 962 where the error rate 950 is above the error threshold 944. Even when the correct operation is less than 100%, the error rate 950 is low enough to calculate the hash values and still achieve the desired effective hash rate 962 by performing useful work even when accounting for outputs that are incorrect. A system capable of optimizing the test circuit design selection and configuration based on the effective hash rate 962 can determine the parameter values for the three components of PPA. For example, the control module 904 of the circuit simulation system 902 can retrieve one or more of the test circuits 924 from the circuit database 925 and simulation operation at different operational power levels and different clock frequencies 958 to determine which parameter combinations to achieve the desired effective hash rate 962. The circuit simulations can be performed on one or more of the simulation engines 906. The results the circuit simulations can be stored in a summary module 908 and the acceptable parameter configurations can be extracted by a parser 909 to generate a report of the parameter values that provide the desired value of the effective hash rate 962.

The operating voltage and operating frequency can be varied in a variety of ways. The voltage and frequency can be varied based on a voltage schedule and a frequency schedule, based on permutations of a voltage range and an operating frequency range, based on predefined values and predefined variations of the values, or other similar methods.

In some embodiments, there may be three known operating voltages and a range of operating frequencies that can be evaluated. In other embodiments, the test circuits can be configured to read the operational voltages and operational frequencies from a table stored in a database or text file. The predefined value pairs can be retrieve and used to test and evaluate the test circuits.

In some embodiments, the simulation of a hash engine can use an input file 920 defining the circuitry of the hash engine and a test vector input file 940 having different block headers 929. The test vector input file 940 can have a data set including multiple values for the block headers 929. The simulation run can process each of the test values in the test vector input file 920 while varying the clock frequency 958 and the operating voltage. At different test settings, the simulation run can detect errors in circuit operations. These errors can include checksum errors, data errors, timing errors, or other types of errors. During the simulation, the system can calculate the error rate 950 for a particular input file 920 operating at the clock frequency 958 and an operating voltage 966.

The error rate 950 can be compared to the error threshold 944, such as a predefined error threshold including a statistical confidence interval, absolute threshold, or other similar threshold techniques. If the error rate 950 of the simulated circuit is not within the error threshold 944 for a particular combination of the clock frequency 958 and the operating voltage 966, then the test circuit 924 defined by the input file 920 can be flagged as not passing at the test criteria.

The error rate 950 can be calculated in a variety of ways. In some embodiments, the circuit represented by the input file 920 can include error registers 964. For example, the input file 920 can include register circuit modules from standard or customized libraries. The error registers 964 can be used to monitor the number of errors in the system.

The circuit simulation system 902 can operate in parallel and run one or more instances of the simulation engine 906 at one time. Each of the simulation engines 906 instances can be run on parallel hardware, multiple instances of the software on a computer, or a combination thereof.

In some embodiments, the simulation engine 906 can simulate operation of portions of the test circuit 924 at different clock frequencies. The input file 920 can include system timing parameters and test parameters including the clock frequency 958, the low clock threshold 952, the high clock threshold 954, the clock interval 956, and a clock configuration file 960. For example, the input file 920 can include directives to simulate a portion of the test circuit 924 between the low clock threshold 952 and at the high clock threshold 954 at intervals of the clock interval 956.

In another embodiment, the input file 920 can includes directives to simulate the test circuit 924 at different clock frequencies ranging between the low clock threshold 952 and the high clock threshold 954 at frequencies separated by the clock interval 956. The simulation engine 906 can simulate the test circuit 924 and measure and track at least some of the operational parameters at the different clock frequencies. This can include at least a circuit power 930, the circuit performance level 932, the effective hash rate 962, and the error rate 950. The performance of the system can be compared to a performance threshold 942 to determine if adequate performance has been achieved. A target effective hash rate 963 can be compared to the performance threshold 942.

In yet other embodiments, the system can simulate one or more hash engines and calculate the effective hash rate 962 at a given set of clock frequencies 958 and the operating voltage 966. The operating voltage 966 can be varied between a low operating voltage and a high operating voltage or against a power threshold 941. The power threshold 941 can be represented by a power level range, an upper power range, a lower power range, or other power ranges. The variations of the power range can include variations in the operating voltage and the operating current.

The operational parameters can be written to the output file 922 to monitor results. The output file 922 can be a text file created and updated by the simulation engine 906. The individual parameters records can be formed using data logging directives in the input file 920.

In some embodiments, the test circuit 924 can include a clock subsystem that can be a configurable frequency clock, such as a clock implemented using a phase locked loop (PLL) circuit. The PLL circuit can be configured to operate at a pre-defined frequency, dynamically updated frequencies, or a combination thereof. The configuration information for the PLL can be stored in a PLL configuration data 928. The PLL configuration data 928 can be implemented as a file, data structure, registers, or other data storage structure. The PLL can be implemented in hardware or as a simulated unit in a circuit simulation system. The PLL can be modulated by changing the registry value used for configuration.

The summary module 908 can process the output file 922 of the simulation engine 906 to extract specific data and process results. The summary module 908 can be configured in a variety of ways. For example, the summary module 908 can include the parser module 909 can be configured for extracting data from the simulation engine 906. The parser module 909 can extract data from the SPICE output file. This can be done with regular expressions, text extraction, pattern matching, or other similar techniques. The SPICE runs can be instrumented to periodically read the voltage values of different nodes in the circuit, such as the latch output nodes, convert the values to binary digital (0/1) value (v>v_ih for 1, v<v_il for 0) and transfer those values into a text or binary file. The parser module can then read the values and compares them to the output from a C/C++ model.

The circuit simulation system 902 can be configured in a variety of ways. In some embodiments, the circuit simulation system 902 can be a standalone system, an automated system, or a combination thereof.

In an automated configuration, the circuit simulation system 902 can retrieve a set of the input files 920 from the circuit database 925, simulate the test circuit 924 described in the input files 920, extract the performance metrics, including the effective hash rate 962, and identify the file identifier 926 of the input file 920 with the highest performance metrics, such as the effective hash rate 962.

The circuit simulation system 902 can use a variety of customized and calculated embodiments of the test circuit 924 and test the test circuits 924 against different combinations of the circuit power 930, clock frequency 958, and circuit area 934.

In some embodiments, the input file 920 can include a circuit design that can be known as a better-than-worst-case design that allows the test circuit 924 to reduce power requirements by optimizing for specific operating conditions rather than optimizing for the worst-case condition. One set of embodiments can include meta-information linked to the input file 920 than defined one or more operational voltage levels and one or more operational clock frequencies for operating the test circuit 924.

In other embodiments, the simulation of the test circuit 924 at the different combinations of power, clock frequency, and circuit area can show improvements in a shorter time by performing multiple simultaneous simulations in the same time interval. The simulations can be performed by varying the test parameters to reflect live conditions to determine the proper parameters for operation in a variety of actual physical environments. The provides the ability to dynamically adjust operation of the circuits to maximize performance and minimize power.

3.0. FUNCTIONAL OVERVIEW

Figure 10:
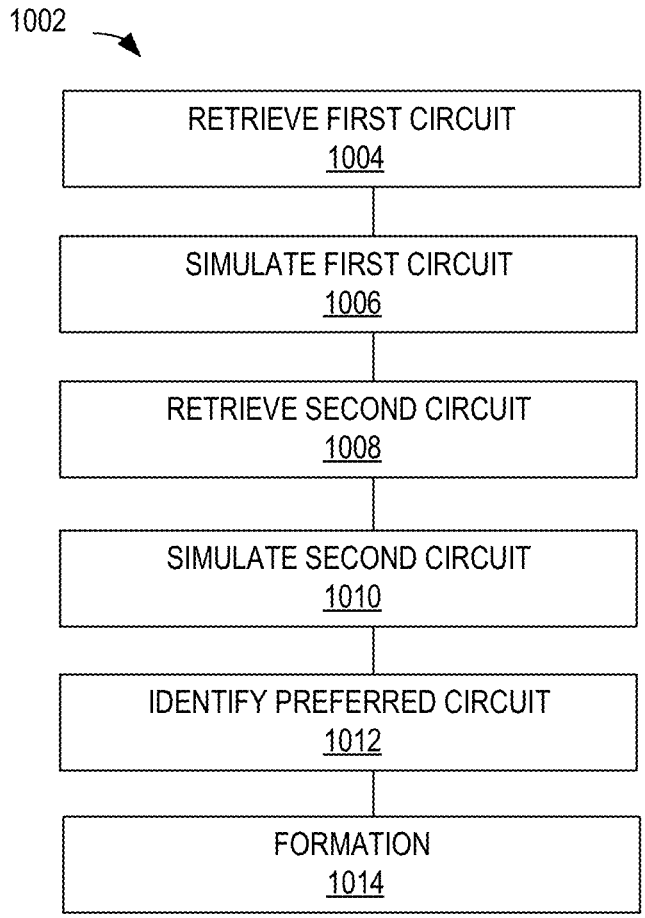
FIG. 10 depicts an example of a manufacturing process flow for the electronic system in an embodiment.

FIG. 10 illustrates an example of a manufacturing process flow 1002 for the electronic system 100 in an embodiment. The manufacturing process flow 1002 can describe the steps and process for manufacturing the electronic system 100.

The manufacturing process flow 1002 can include a variety of operations. In an illustrative embodiment, the manufacturing process flow 1002 can include a retrieve first circuit step 1004, a simulate first circuit step 1006, a retrieve second circuit step 1008, a simulate second circuit step 1010, an identify preferred circuit step 1012, and a formation step 1014.

In the retrieve first circuit step 1004, the circuit simulation system 100 can identify and retrieve a first input file 920 for a first test circuit 1020 from the circuit database 925. The input file 920 for the first test circuit 1020 can include the netlist data for the components and connections of the first test circuit 1020.

In some embodiments, a first input file 1022 of the first test circuit 1020 can include simulation and test directives for evaluating the first test circuit 1020. The simulation and test directives can be configured as part of the first input file 1022 or linked to the first input file 1022.

In the simulate first circuit step 1006, the first input file 1022 can be processed by the simulation engines 906. In some embodiments, the simulation engine 906, such as a SPICE engine, can read and validate the first input file 1022, simulate the first test circuit 1020, and write the results into a first output file 1034. A first effective hash rate 1030 can be determined for the first test circuit 1020.

In another embodiment, the first effective hash rate 1030 can be calculated in a variety of ways. In one embodiment, the first effective hash rate 1030 can be calculated by retrieving hit information from registers in the first test circuit 1020. The first test circuit 1020 can include several registers including a general hit count register with the number of preliminary hits from all unmasked engine, a general true hit count register with the number of actual hits from all unmasked engines, a specific hit count register with the number of preliminary hits from a specific hash engine, a specific true hit count with the number of actual hits from a specific hash engine, a difficult hit count register with the number of hits that pass the difficulty threshold, and a dropped hit count register with the number of hits which were discarded due to lack of buffering. The statistical hit and true hit data can be stored in the registers and retrieved to calculate the first effective hash rate 1030.

In the retrieve second circuit step 1008, a second input file 1026 of a second test circuit 1024 can include simulation and test directives for evaluating the second test circuit 1024. The simulation and test directives can be configured as part of the second input file 1026 or linked to the second input file 1026.

In the simulate second circuit step 1010, the second input file 1026 of the second test circuit 1024 can be processed by the simulation engines 906. In some embodiments, the simulation engine 906, such as a SPICE engine, can read and validate the second input file 1026, simulate the second test circuit 1024, and write the results into a second output file 1036. A second effective hash rate 1032 can be determined for the second test circuit 1024.

In another embodiment, the second effective hash rate 1032 can be calculated in a variety of ways. In one embodiment, the first effective hash rate 1030 can be calculated by retrieving hit information from registers in the second test circuit 1024. The second test circuit 1024 can include several registers including a general hit count register with the number of preliminary hits from all unmasked engine, a general true hit count register with the number of actual hits from all unmasked engines, a specific hit count register with the number of preliminary hits from a specific hash engine, a specific true hit count with the number of actual hits from a specific hash engine, a difficult hit count register with the number of hits that pass the difficulty threshold, and a dropped hit count register with the number of hits which were discarded due to lack of buffering. The statistical hit and true hit data can be stored in the registers and retrieved to calculate the second effective hash rate 1032.

In the identify preferred circuit step 1012, the first effective hash rate 1030 can be compared to the second effective hash rate 1032. If the first effective hash rate 1030 is greater than the second effective hash rate 1032, then the first test circuit 1020 is assigned to a preferred circuit 1028. If the first effective hash rate 1030 is less than or equal to the second effective hash rate 1032, then the second test circuit 1024 is assigned as the preferred circuit 1028.

In the formation step 1014, an optional process can use the preferred circuit 1028 to build a hardware implementation of the preferred circuit 1028 for hash engines 1038. For example, the preferred circuit 1028 can be implemented as an ASIC chip.

In some embodiments, the formation step 1014 can be used to configure the operational parameters of live versions of the preferred circuit 1028 that have been previously fabricated to maximize system performance based on actual conditions. The simulations may be used to guide live operations by updating the operational parameters such as power and clock frequency for the preferred circuit 1028.

Other examples of these and other embodiments are found throughout this disclosure.

4.0. EXAMPLE EMBODIMENTS

Examples of some embodiments are represented, without limitation, in the following clauses and use cases:

According to an embodiment, a method of manufacture of an electronic system comprises retrieving a first test circuit file from a circuit database, simulating the first test circuit file on a circuit simulation system configured to calculate a first effective hash rate of the first test circuit, retrieving a second test circuit from the circuit database, simulating the second test circuit file on the circuit simulation system to calculate a second effective hash rate of the second test circuit, the second test circuit operating at a different operating voltage than the first test circuit, the second test circuit operating at a different operating clock frequency than the first test circuit, comparing the first effective hash rate and the second effective hash to identify a preferred circuit having a target effective hash rate above a performance threshold, and forming an electronic system for a digital currency mining system using the preferred circuit.

In an embodiment, the method further comprises simulating the second test circuit over a set of operating clock frequencies, calculating a test hash rate and a hashing error rate of the second test circuit at each of the set of operating clock frequencies, identifying the effective hash rate of the second test circuit by determining a maximum test hash rate of the second test circuit with the hashing error rate below an error rate threshold over the set of operating clock frequencies, the maximum test hash rate at a peak clock rate, configuring the preferred circuit to operate at the peak clock rate.

In an embodiment, the method further comprises simulating the second test circuit over a set of operating voltages, calculating a test hash rate and a hashing error rate of the second test circuit at each of the set of operating voltages at a fixed operating clock frequency, and identifying the effective hash rate of the second test circuit as a maximum test hash rate with the hashing error rate below an error rate threshold over the set of operating voltages, the maximum test hash rate at a peak operating voltage, and configuring the preferred circuit to operate at the peak operating voltage.

In an embodiment, the method further comprises calculating the first test hash rate using the first test circuit configured to implement at least one SHA-256 hash engine, and calculating the second test hash rate using the second test circuit configured to implement at least one SHA-256 hash engine.

In an embodiment, the method further comprises calculating the hashing error rate as the sum of a functional error rate and an operational error rate.

In an embodiment, the method further comprises the first test circuit is configured as a SHA-256 hash engine having two or more compressor units sharing a message schedule generated by one expander unit.

In an embodiment, the method further comprises configuring the first test circuit to have a first power consumption lower than a second power consumption of the second test circuit.

In an embodiment, the method further comprises configuring the first test circuit to have a first circuit surface area lower than a second circuit surface area of the second test circuit.

In an embodiment, the method further comprises simulating an expander coupled to a compressor configured to calculate a hash digest.

In an embodiment, the method further comprises simulating an expander configured to form a message schedule of data from a first chunk of an initial message.

According to an embodiment, an electronic system comprises a circuit database having a first test circuit file entry and a second test circuit file entry, a circuit simulation system configured to calculate a first effective hash rate of the first test circuit and a second effective hash rate of the second test circuit, the second test circuit operating at a different operating voltage than the first test circuit, the second test circuit operating at a different operating clock frequency than the first test circuit, and a control unit configured to compare the first effective hash rate to the second effective hash to identify a preferred circuit having a higher effective hash rate and the control unit configured to form an electronic system for a digital currency mining system with the preferred circuit.

In an embodiment, the system further comprises a clock subsystem configured to generate a set of operating clock frequencies, and wherein the control unit is configured to calculate a test hash rate and a hashing error rate of the second test circuit at each of the set of operating clock frequencies with a fixed operating voltage and configured to identify the effective hash rate of the second test circuit by determining a maximum test hash rate of the second test circuit with the hashing error rate below an error rate threshold over the set of operating clock frequencies, the maximum test hash rate at a peak clock rate, and the circuit simulation system is configured to simulate the preferred circuit at the peak clock rate.

In an embodiment, the system further comprises the circuit simulation system configured to simulate the second test circuit over a set of operating voltages, the control unit is configured to calculate a test hash rate and a hashing error rate of the second test circuit at each of the set of operating voltages with a fixed operating clock frequency and configured to identify the effective hash rate of the second test circuit as a maximum test hash rate with the hashing error rate below an error rate threshold over the set of operating voltages, the maximum test hash rate at a peak operating voltage, and the circuit simulation system is configured to simulate the preferred circuit at the peak operating voltage.

In an embodiment, the system further comprises the first test circuit configured to implement at least one SHA-256 hash engine, and the second test circuit is configured to implement at least one SHA-256 hash engine.

In an embodiment, the system further comprises the control unit configured to calculate the hashing error rate as the sum of a functional error rate and an operational error rate.

In an embodiment, the system further comprises the first test circuit configured as a SHA-256 hash engine having two or more compressor units sharing a message schedule generated by one expander unit.

In an embodiment, the system further comprises the first test circuit configured to have a first power consumption lower than a second power consumption of the second test circuit.

In an embodiment, the system further comprises the first test circuit configured to have a first circuit surface area lower than a second circuit surface area of the second test circuit.

In an embodiment, the system further comprises an expander coupled to a compressor configured to calculate a hash digest.

In an embodiment, the system further comprises an expander configured to form a message schedule of data from a first chunk of an initial message.

5.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being coupled to various other components by arrows. These arrows illustrate only certain examples of current flows between or through the components. Neither the direction of the arrows nor the lack of arrow lines between certain components should be interpreted as indicating the existence or absence of a flow between the certain components themselves.

In the specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this system, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It is understood that the system functionality can be described using terms like module, unit, system, subsystem, pod, and component that represent devices that can be implemented using different combinations of mechanical and electronic elements. The systems and devices can include electric subsystems, mechanical subsystems, and other physical elements to operate and control the system. These elements can include computing elements that can execute the firmware and software of the system to control mechanical features of the system. In addition, the mechanical elements of the system can operate with or without control mechanisms in regular operation.

The invention claimed is:

1. A method of operation of an electronic system comprising:
   retrieving a first test circuit file from a circuit database;
   simulating the first test circuit file on a circuit simulation system configured to calculate a first effective hash rate of the first test circuit;
   retrieving a second test circuit from the circuit database;
   simulating the second test circuit file on the circuit simulation system to calculate a second effective hash rate of the second test circuit, the second test circuit operating at a different operating voltage than the first test circuit, the second test circuit operating at a different operating clock frequency than the first test circuit;
   comparing the first effective hash rate and the second effective hash to identify a preferred circuit having a target effective hash rate above a performance threshold; and
   forming an electronic system for a digital currency mining system using the preferred circuit.

2. The method as claimed in claim 1, wherein simulating the second test circuit includes:
   simulating the second test circuit over a set of operating clock frequencies;
   calculating a test hash rate and a hashing error rate of the second test circuit at each of the set of operating clock frequencies;
   identifying the effective hash rate of the second test circuit by determining a maximum test hash rate of the second test circuit with the hashing error rate below an error rate threshold over the set of operating clock frequencies, the maximum test hash rate at a peak clock rate; and configuring the preferred circuit to operate at the peak clock rate.

3. The method as claimed in claim 1, wherein simulating the second test circuit includes:
  simulating the second test circuit over a set of operating voltages;
  calculating a test hash rate and a hashing error rate of the second test circuit at each of the set of operating voltages at a fixed operating clock frequency;
  identifying the effective hash rate of the second test circuit as a maximum test hash rate with the hashing error rate below an error rate threshold over the set of operating voltages, the maximum test hash rate at a peak operating voltage; and
  configuring the preferred circuit to operate at the peak operating voltage.

4. The method as claimed in claim 1, wherein simulating the first test circuit includes:
  calculating the first test hash rate using the first test circuit configured to implement at least one SHA-256 hash engine; and
  calculating the second test hash rate using the second test circuit configured to implement at least one SHA-256 hash engine.

5. The method as claimed in claim 1, wherein comparing the first effective hash rate includes calculating the hashing error rate as the sum of a functional error rate and an operational error rate.

6. The method as claimed in claim 1, wherein the first test circuit is configured as a SHA-256 hash engine having two or more compressor units sharing a message schedule generated by one expander unit.

7. The method as claimed in claim 6, wherein comparing the first effective hash rate includes configuring the first test circuit to have a first power consumption lower than a second power consumption of the second test circuit.

8. The method as claimed in claim 6, wherein comparing the first effective hash rate includes configuring the first test circuit to have a first circuit surface area lower than a second circuit surface area of the second test circuit.

9. The method as claimed in claim 6, wherein simulating the first test circuit includes simulating an expander coupled to a compressor configured to calculate a hash digest.

10. The method as claimed in claim 6, wherein simulating the first test circuit includes simulating an expander configured to form a message schedule of data from a first chunk of an initial message.

11. An electronic system comprising:
  a circuit database having a first test circuit file entry and a second test circuit file entry;
  a circuit simulation system configured to calculate a first effective hash rate of the first test circuit and a second effective hash rate of the second test circuit, the second test circuit operating at a different operating voltage than the first test circuit, the second test circuit operating at a different operating clock frequency than the first test circuit; and
  a control unit configured to compare the first effective hash rate to the second effective hash to identify a preferred circuit having a higher effective hash rate and the control unit configured to form an electronic system for a digital currency mining system with the preferred circuit.

12. The system as claimed in claim 11, further comprising:
  a clock subsystem configured to generate a set of operating clock frequencies; and wherein:
  the control unit is configured to calculate a test hash rate and a hashing error rate of the second test circuit at each of the set of operating clock frequencies with a fixed operating voltage and configured to identify the effective hash rate of the second test circuit by determining a maximum test hash rate of the second test circuit with the hashing error rate below an error rate threshold over the set of operating clock frequencies, the maximum test hash rate at a peak clock rate; and
  the circuit simulation system is configured to simulate the preferred circuit at the peak clock rate.

13. The system as claimed in claim 11, wherein:
  the circuit simulation system is configured to simulate the second test circuit over a set of operating voltages;
  the control unit is configured to calculate a test hash rate and a hashing error rate of the second test circuit at each of the set of operating voltages with a fixed operating clock frequency and configured to identify the effective hash rate of the second test circuit as a maximum test hash rate with the hashing error rate below an error rate threshold over the set of operating voltages, the maximum test hash rate at a peak operating voltage; and
  the circuit simulation system is configured to simulate the preferred circuit at the peak operating voltage.

14. The system as claimed in claim 11, wherein:
  the first test circuit is configured to implement at least one SHA-256 hash engine; and
  the second test circuit is configured to implement at least one SHA-256 hash engine.

15. The system as claimed in claim 11, wherein the control unit is configured to calculate the hashing error rate as the sum of a functional error rate and an operational error rate.

16. The system as claimed in claim 11, wherein the first test circuit is configured as a SHA-256 hash engine having two or more compressor units sharing a message schedule generated by one expander unit.

17. The system as claimed in claim 16, wherein the first test circuit is configured to have a first power consumption lower than a second power consumption of the second test circuit.

18. The system as claimed in claim 16, wherein the first test circuit is configured to have a first circuit surface area lower than a second circuit surface area of the second test circuit.

19. The system as claimed in claim 16, wherein the first test circuit includes an expander coupled to a compressor configured to calculate a hash digest.

20. The system as claimed in claim 16, wherein the first test circuit includes an expander configured to form a message schedule of data from a first chunk of an initial message.

* * * * *